United States Patent [19]

Gealy

[11] Patent Number: 4,535,723

[45] Date of Patent: Aug. 20, 1985

[54] ANIMAL HANDLING AND PROCESSING FACILITY

[76] Inventor: Elizabeth L. Gealy, P.O. Box 1103, La Jolla, Calif. 92038

[21] Appl. No.: 157,685

[22] Filed: Jun. 9, 1980

[51] Int. Cl.$^3$ .............................................. A01K 1/00
[52] U.S. Cl. ...................................... 119/20; 119/155
[58] Field of Search ...................... 119/20, 155, 15, 27

[56] References Cited

U.S. PATENT DOCUMENTS

| | | | |
|---|---|---|---|
| 320,710 | 6/1885 | Shedd | 119/155 |
| 3,545,407 | 12/1970 | Moore | 119/20 |

FOREIGN PATENT DOCUMENTS

| | | | |
|---|---|---|---|
| 1264136 | 3/1968 | Fed. Rep. of Germany | 119/20 |
| 2221072 | 10/1974 | France | 119/155 |

Primary Examiner—Jay N. Eskovitz
Attorney, Agent, or Firm—Gary C. Honeycutt

[57] ABSTRACT

An assembly of gates and pens, or other enclosures, for assembling, sorting, holding, and guiding animals to and from one or more processing stations. A plurality of perimeter gates define and enclose a sorting area having a second set of gates which divide the sorting area into separate sections. A number of holding pens, or other enclosures, adjoin the sorting area such that access to the sorting area from each holding pen is provided by a perimeter gate. Animals are guided from a holding pen, through the sorting area, then through a crowding area, then through a lead-up alley which exits back into the sorting area, one section of which is thus used for redirecting processed animals while another section is being used for incoming animals.

5 Claims, 1 Drawing Figure

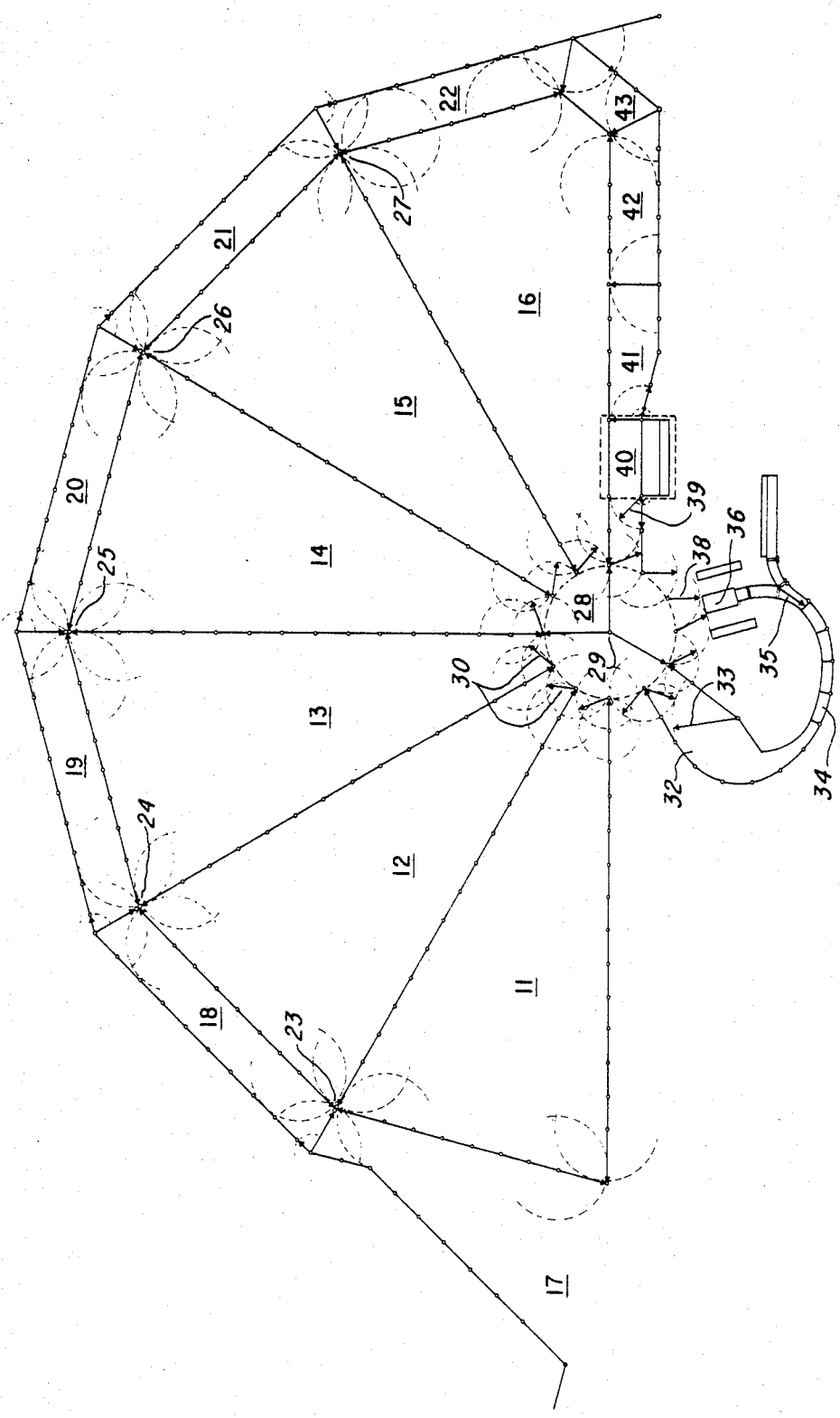

ANIMAL HANDLING AND PROCESSING FACILITY

This invention relates to the handling and processing of animals; and more particularly to an assembly of gates and enclosures for gathering, sorting, holding, guiding, and processing animals.

In the processing of large animals, such as cattle, much attention has been directed to improvements in handling facilities, including gates and pens, or other enclosures, commonly known as "corrals." The primary object of such improvements has been to reduce the required processing time per animal, while minimizing injury and weight loss or other damage to the animals, and simplifying labor requirements. Some corrals have included a central, semicircular sorting area surrounded by a plurality of adjacent holding pens, which may be wedge shaped. They permit animals to be routed from a holding pen through a sorting area and then to one or more processing stations. After processing, the animals are commonly released to a holding pen separate from the initial pens, from which they must later be removed and/or resorted prior to further handling; or for loading for shipment; or for return to pasture. Generally, there has been no fencing or gating provided specifically for redirecting processed animals to further sorting or processing.

Accordingly, it is an object of the present invention to provide an animal handling facility wherein processed animals are efficiently re-sorted and routed back to a selected enclosure, or, if desired, to an area for subsequent processing, or for shipping, or other purposes.

One aspect of the invention is embodied in an assembly comprising a first plurality of gates which enclose and define at least a portion of the perimeter of a sorting area having a second set of gates therein for dividing the sorting area into separate sections. A plurality of enclosures adjoin the sorting area, such that each of the enclosures is separated from the sorting area by one of the perimeter gates.

The assembly also includes a passageway for guiding one or more animals from the sorting area into one or more processing stations; and a second passageway or other means for passing the animals back into the sorting area. The second set of gates in the sorting area are arranged to permit the sorting and passage of animals, not only en route to a processing station or stations, but also en route from such a station back to one of the enclosures surrounding the sorting area, or to another processing area. Preferably, the gates in the sorting area are arranged to permit such two-way passage of animals concurrently, so that neither has to be interrupted to permit the other.

In a preferred embodiment, the passageway from the sorting area to the first processing station includes some means for directing animals from a randomly dispersed group into a progressively more confined passageway, so that the animals are forced to assume a single-file formation, and thereby facilitate their entry one at a time into the first processing station, and into any subsequent station.

It is also preferred to include some means for pacing the rate of single file passage, and for restraining each animal separately while in single-file formation, so that retreat is prevented, and so that variations in processing time at each processing station are readily accomodated.

A processing station may include means for restraining, identifying, inspecting, evaluating, and/or treating each animal.

It will be apparent that the assembly of the invention is useful in the handling and processing of a wide variety of animals, including cattle, sheep, goats, hogs, turkeys, chickens, rabbits and mice, for example. Large groups of people may even be "processed" with the invention, such as at a medical clinic, or at an amusement park, for example. Extremely small animals may also be so processed, including bacteria and other microbes, for example.

In a specific embodiment for handling and processing cattle, the sorting area is substantially circular, and essentially the entire perimeter thereof is made up of hinged gates, enclosing and defining a sorting ring. A second plurality of gates, preferably three in number, are hinged on a single post located at the center of the sorting ring. Each centrally hinged gate extends to the perimeter of the ring, and may be latched to any of the perimeter gate posts, thereby dividing the sorting ring into three sections, in the preferred embodiment.

A plurality of holding pens adjoin the sorting ring, each pen having access to the sorting area through a perimeter gate of the ring. Thus, each pen is wedge-shaped, and together they form an outer perimeter, concentric with the sorting ring. A sorting alley is located along the outer perimeter of the holding pens, through which gated access is provided to each of the holding pens.

One of the sorting ring gates leads into a crowding area having a curved wall bounded by rails, fencing, and/or solid walls, for crowding the cattle into a lead-up alley by means of a gate hinged on the wall opposite to the curved wall, and having a length sufficient to clear the curved wall with a tolerance too small to permit passage of an animal between the gate and the curved wall.

The lead-up alley is a curved passageway of panels and rails or the like, for guiding the animals single-file into a processing station containing a squeeze chute, calf cradle, and/or other processing equipment. The lead-up alley is equipped with a series of blocking gates for restraining the animals individually, to pace their rate of progress through the alley, and to prevent retreat.

The processing area includes, if desired, more than one processing station, either in parallel or in series. After the processing area, the assembly includes an exit back into the sorting ring, through one of the ring perimeter gates. If parallel processing stations are provided, more than one exit back into the sorting ring is readily provided, through separate gates, so that processed animals need not be routed through a single path back into the sorting ring.

Because the sorting ring is divided into separate sections, the processed animals are readily passed through one section while unprocessed animals are passing in the opposite direction through another section. By selective placement of the gates in the sorting area, a wide variety of choices is available with respect to which enclosure or enclosures connect through the sorting area for incoming animals, concurrently with a selected connection through another section for exiting processed animals.

The illustrated embodiment includes a plurality of holding pens 11 through 16, initial access to which is usually gained by way of sorting alleys 17 through 22 and gates 23 through 27. That is, animals are herded through entrance alley 17 while a worker may be stationed at one or any number of gates 23 through 27, so that the animals may be sorted and held in one or more separate pens, according to age, size, sex, color, etc. Obviously, fewer than the total number of pens may be used for the initial sort.

Each holding pen is provided with a gate 30 leading into sorting ring 28, wherein three gates are hinged on central post 29 for the purpose of guiding animals through area 28, and through gate 31 into crowding area 32, which includes gate 33 for crowding the animals into lead-up alley 34, where single-file formation is required. The lead-up alley includes a series of blocking gates for restraining the animals individually, to pace their rate of passage, and to prevent retreat. Then, by means of gate 35 the animals are selected, one at a time for passage into squeeze chute 36 or onto loading ramp 37.

After examination and/or treatment in the squeeze chute, each animal is then guided back into the sorting ring 28 by means of gates 38. Proper placement of the sorting ring gates directs each animal back to a selected holding pen, or through gate 39 onto scales 40 and/or sorting alleys 41 through 43, from which selected animals may be released to an open area or guided back through alleys 17 through 22, from which further sorting may be achieved, or selected animals may be released back through alley 17 into the pasture from which they were initially herded.

It can readily be seen from the above description that there is unrestricted freedom to select any animal from any of the holding pens, guide it through the lead-up alley and through one or more processing stations, and then back to its original pen, or to any other pen, without interrupting a continual flow of incoming animals through sorting ring 28.

What is claimed is:

1. An animal handling facility comprising:
   a first plurality of gates defining at least a portion of the perimeter of a generally circular sorting area;
   a second plurality of gates hinged on a single post centrally located in said sorting area, dividing said sorting area into separate sections; a plurality of enclosures adjoining said sorting area, such that each of said enclosures is separated from the sorting area by one of said perimeter gates; means for guiding an animal from said sorting area into one or more processing stations; and
   means for guiding said animal from said station or stations back into a different section of said sorting area, such that re-sorting of processed animals may be achieved without interrupting the passage of incoming animals.

2. A facility as in claim 1, wherein substantially the entire perimeter of the sorting area is defined by said first plurality of gates.

3. A facility as in claim 1, including a crowding area and a lead-up alley, which in combination with the processing area form a curved loop extending from said sorting area and back to a separate section of the sorting area.

4. A facility as in claim 1, wherein said means for guiding an animal to said processing station includes means for inducing a randomly dispersed group of animals to form a single-file formation.

5. An animal handling facility comprising:
   a first plurality of gates defining at least a portion of the perimeter of a sorting area;
   a second plurality of gates dividing said sorting area into separate sections;
   a plurality of enclosures adjoining said sorting area, such that each of said enclosures is separated from the sorting area by one of said perimeter gates;
   means for guiding an animal from said sorting area into one or more processing stations;
   means for guiding said animal from said station or stations back into a different section of said sorting area, such that re-sorting of processed animals may be achieved without interrupting the passage of incoming animals; and
   further including a sorting valley that connects with a perimeter gate of the sorting area and extends along the outer perimeter of the holding pens that adjoin the sorting area.

* * * * *